March 24, 1936.  S. H. GIFFIN  2,034,806
TELEGRAPH TESTING SYSTEM
Filed Nov. 28, 1934   2 Sheets-Sheet 1

INVENTOR
S. H. GIFFIN
BY
ATTORNEY

March 24, 1936.　　　　　S. H. GIFFIN　　　　　2,034,806
TELEGRAPH TESTING SYSTEM
Filed Nov. 28, 1934　　　2 Sheets-Sheet 2

INVENTOR
S. H. GIFFIN
BY
ATTORNEY

Patented Mar. 24, 1936

2,034,806

UNITED STATES PATENT OFFICE 2,034,806

TELEGRAPH TESTING SYSTEM

Sidney Hudson Giffin, Baltimore, Md., assignor to American Telephone and Telegraph Company, a corporation of New York Application November 28, 1934, Serial No. 755,203

7 Claims. (Cl. 178—69)

This invention relates to telegraph systems and more particularly to testing the operating margins of printing telegraph systems.

The object of this invention is to provide a system and apparatus for automatically measuring and recording the operating limits or margins of printing telegraph circuits.

A feature of these switching instrumentalities is the arrangement provided to enable the testing apparatus to be connected to any of the telegraph lines if and when necessary or desired.

A further object of the invention is to provide switching instrumentalities for automatically and successively connecting the measuring and recording system and apparatus to each of a group of telegraph circuits for routine test purposes.

In brief, the measuring and recording system or apparatus comprises two receiving distributors. The limits or orientation of one of said distributors is automatically varied. Contacts are provided on each distributor and are interconnected with circuit means to compare the signals as received by these two distributors. A recording mechanism is jointly controlled by the apparatus for automatically varying the limits of one of said distributors and the circuit means for comparing the signals as received by said two distributors. A printing mechanism may be associated with either or both of said distributors to serve as a monitoring printer if desired. The distributors may be connected to the telegraph circuits to be tested in any suitable manner. Automatic switching apparatus may be employed if desired to connect each of a plurality of telegraph circuits to said two distributors in succession. This arrangement is particularly suitable for monitoring purpose.

Figure 1:
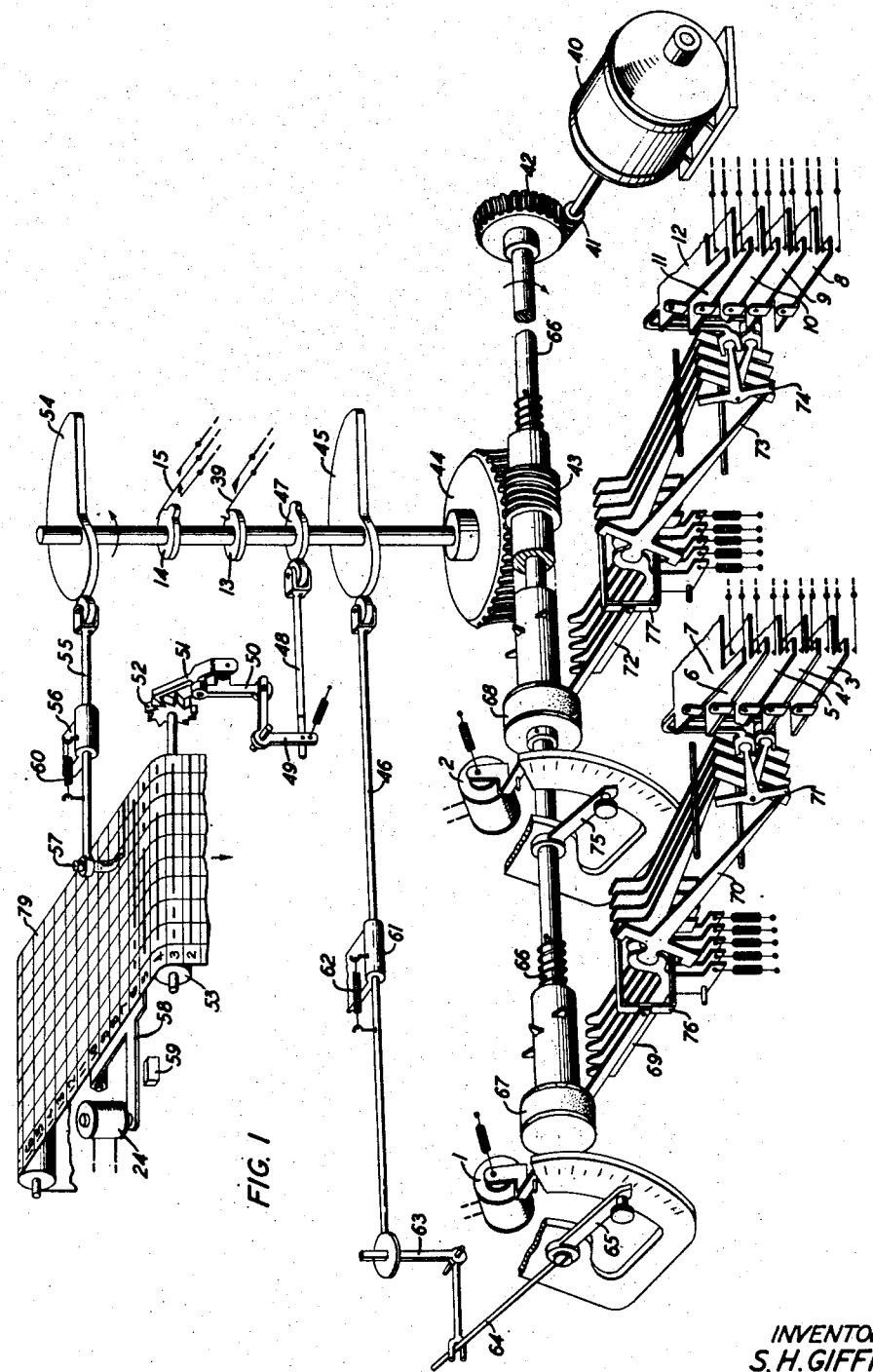
Figure 2:
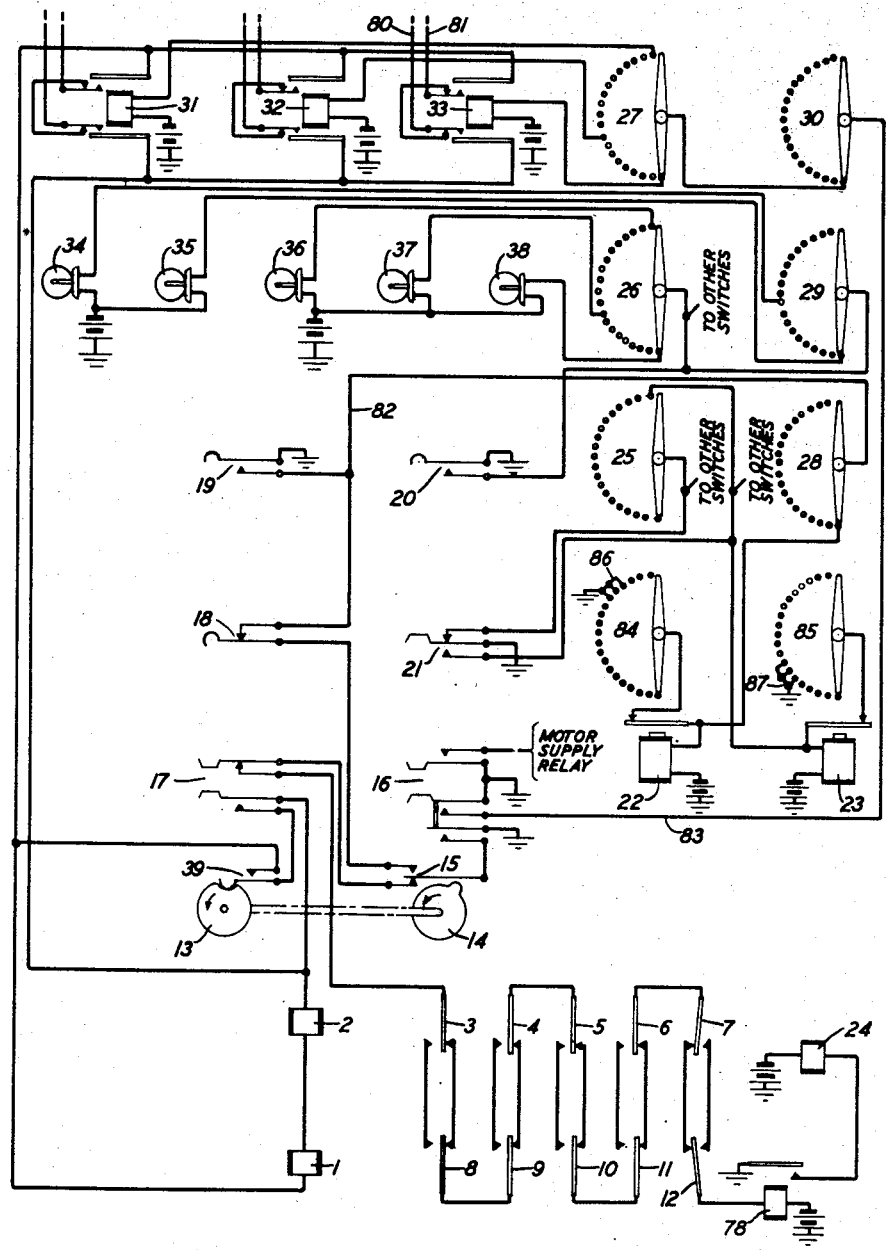

The invention will be more readily understood by reference to the drawings in which:

Figure 1 shows the mechanical arrangement of the apparatus in an embodiment of the invention; and Fig. 2 shows the electrical connections including selector switches which permit the automatic testing of a number of working circuits in rotation.

Referring particularly to Fig. 1, the selective or impulse distributing apparatus of two printer telegraph receivers are shown in a mechanical arrangement such that both of them may be driven by a common shaft 66 through individual friction drives 67 and 68. These distributors or selecting mechanisms are usually arranged to position permutation elements in accordance with received impulses. In doing this a portion of the impulse period near the center of the impulse period is used to position the permutation elements. Due to different line conditions and different apparatus adjustments, it is desirable to adjust or select the most favorable portion of the period. This adjustment is called the orientation of the distributor. In accordance with this invention the selective mechanism associated with friction drive 68 is given a standard adjustment or orientation by means of adjusting lever 75 while the selective apparatus associated with friction drive 67 is given a different adjustment for each succeeding series of pulses for the entire range of adjustment of lever 65 and a comparison made between the signal impulses recorded by the two selectors for each adjustment. The comparison is effected by adding contacts to selecting members of both selectors and providing a circuit which energizes magnet 24 which in turn causes a mark to be made on paper 79 whenever the two selective mechanisms are in agreement. Arrangements are provided so that the stylus is moved to a different position on the paper for each adjusting position of lever 65 and the paper is moved to a new line and another telegraph line connected when the whole range of adjustment has been covered.

The operation of the apparatus will now be described in detail. In order to put the apparatus in condition to receive pulses, key 16 (Fig. 2) is operated, starting motor 40 (Fig. 1) in the usual manner. Motor 40 rotates shaft 66 through worm 41 and gear wheel 42. The operation of key 16 also operates one of the relays such as relay 31, 32 or 33 to connect a telegraph line to the testing apparatus. Switches shown diagrammatically by stepping magnets 22 and 23 and arcs of contacts 25, 26, 27, 28, 29, 30, 84, and 85 are provided so that a large number of telegraph circuits may be connected to the testing apparatus. Lamps such as 34, 35, 36, 37, and 38 indicate, when key 20 is operated, which circuit is connected for test.

Let it be assumed that the brushes on arcs 25, 26, 27, and 84 associated with magnet 22 and the brushes on arcs 28, 29, 30, and 85 associated with magnet 23 are standing on the terminals shown and that the mechanism shown in Fig. 1 is in its normal position with stylus 57 in its first position at the right-hand edge of paper 79 and that adjusting lever 65 is in its bottom position of adjustment which corresponds to the most retarded (or most advanced) adjusting position. Relay 33 is operated in a circuit traced from ground on the center contacts of key 16, lead 83, brush and terminal No. 1 of arc 30, brush and terminal No. 1 of arc 27 to battery through the winding of relay 33. Relay 33, operated, first connects the printer magnets or relays 1 and 2 in series with the telegraph line to be tested through wires 80 and 81 and then removes the short circuit normally across wires 80 and 81 provided by the upper and lower break contacts of relay 33. This short circuit is provided to keep the telegraph line closed. After the operation of relay 33 the telegraph line circuit is traced from conductor 81, upper front contact of relay 33 through the windings of relays 1 and 2 in series, lower front contact of relay 33 to line wire 80.

In this condition relays 1 and 2 will follow the line pulses and upon the first open circuit will release the selective mechanisms associated with friction drives 67 and 68 and will function, in the manner well-known in the printing telegraph art, operating levers such as 69 and 72 and swords such as 70 and 73, T-levers such as 71 and 74 and code bars 3, 4, 5, 6, 7, 8, 9, 10, 11, and 12 in accordance with the pulses received. A more detailed description of the operation of these receiving distributors may be found in U. S. Patent 1,904,164 granted to S. Morton et al. April 18, 1933 which is hereby made part of this description. If the first or most retarded adjustment of lever 65 results in the same setting of the code bars 3 to 7 as the setting of code bars 8 to 12 associated with friction drive 68 which is given a standard adjustment, a circuit is closed from ground on the lower contacts of key 16, normally made contacts 15 of cam 14, the upper break contacts of key 17, through the contacts of permutation elements or code bars 3, 4, 5, 6, 7, 8, 9, 10, 11, and 12 to battery through the winding of relay 78. Relay 78 operates in this circuit and operates magnet 24 (Figs. 1 and 2) which attracts armature 58 elevating paper 79 against stylus 57 which marks the paper in this position as cam 54 advances stylus 57 to the next position on the paper. At any time that the two selective mechanisms get out of step or record different code combinations, the circuit just traced is broken, relay 78 and magnet 24 are released and stylus 57 does not draw a line in that position on the paper representing an adjustment of lever 65.

In rotating, the selective mechanism associated with friction drive 68 also operates worm 43 and gear wheel 44 rotating the cams associated with wheel 44. Cam 54 pushes push rod 55 through guide 56 against the pressure of spring 60 and moves stylus 57 to the next position on paper 79. Cam 45 pushes push rod 46 through guide 61 against the pressure of spring 62 and through bell crank 63, changes the adjustment of lever 65 through extension 64 to the next position of adjustment. The apparatus now awaits the next train of pulses which when they are received are again tested with the new adjustment of lever 65 as explained before and the paper marked if the two mechanisms are in agreement.

When cams 45 and 54 have moved stylus 57 and adjusting lever 65 to their limiting positions, cams 45 and 54 return adjusting lever 65 and stylus 57 to their original positions and cam 14 operates spring 15 momentarily at the end of the last train of pulses. The operation of spring 15 advances the brushes on arcs 25, 26, 27, and 84 associated with switch 22 to the next position, releasing relay 33 and operating a similar relay connected to the next telegraph line. At the same time cam 47 also operates push rod 48 and through levers 49, 50, and 51 advances sprocket wheel 52 one notch rotating roller 53 and advancing paper 79 to the next line or position. The circuit for momentarily energizing switch magnet 22 and advancing the brushes on arcs 25, 26, 27, and 84 to the next position is traced from ground on the lower contacts of key 16, operated contacts of springs 15, contacts of key 18, brush and terminal No. 1 of arc 28 to battery through the winding of magnet 22. When magnet 22 is released, the brushes associated with arcs 25, 26, 27, and 84 advance to the next terminal and connect ground from the middle contacts of key 16 through brush and No. 1 terminal of arc 30 and brush and No. 2 terminal of arc 27 to the relay (not shown) associated with the next line.

For the sake of brevity three relays, only, 31, 32, and 33 connected to the first, an intermediate, and the last terminals on arc 27 have been shown. In a similar way only one switch, represented by magnet 22 and arcs 25, 26, 27, and 84, is shown connected to arcs 28 and 30 although the system as disclosed is arranged for twenty such switches connected to the terminals of arc 28 each having twenty relays such as relay 33 connected to its terminals. In addition, the system is not limited to switches of the type described but may employ one or more switches of any suitable type.

When the operations of spring 15 have progressed, the brushes associated with arcs 25, 26, 27, and 84 to the last terminals on their banks a circuit is closed to operate magnet 23. This circuit is traced from ground through the normally closed contacts of key 21, brush and twentieth terminal of arc 25 to battery through the winding of magnet 23. When through the subsequent operation of spring 15 the brushes associated with arcs 25, 26, 27, and 84 are advanced to the first terminals, the circuit just traced is broken, magnet 23 released and the brushes associated with arcs 28, 29, 40 and 85 are advanced to their second terminals which are connected to a second switch. This switch is then advanced over all of its terminals after which magnet 23 is again actuated, etc.

Certain auxiliary apparatus is furnished to indicate which telegraph or working line is connected to the testing set, to return the testing set to the normal position, to progress the switches associated with magnets 22 and 23, manually to any desired working line and to test one line repeatedly.

Thus, the operation of key 20 connects ground through its contacts through the brushes associated with arcs 26 and 29 to battery through the filaments of the lamps connected to the terminals on which the brushes may be standing such as lamps 38 and 35 which are associated with terminal No. 1. Current flowing in this circuit lights these lamps and indicates the line to which the test apparatus is connected.

Key 17, when operated, returns the testing apparatus to its normal position by short-circuiting relays 1 and 2, releasing these relays but holding the line circuit closed. The line circuit under this condition is traced from line wire 81, upper front contact of relay 33, off-normal contact 39, lower front contact of key 17, lower front contacts of relay 33 to line wire 80. Relays 1 and 2, released, cause the selective mechanism to function and rotate worm 43, wheel 44 and cam 13 in the usual manner. When cam 13 returns to its normal position, contact 39 will open the short circuit path for relays 1 and 2 and these relays will reoperate stopping the mechanism in the normal position. Key 17, operated, also breaks the circuit through its upper contacts to relay 78 so that stylus 57 does not touch paper 79 while the apparatus is being returned to normal. Key 19, when operated, places ground on conductor 82 and operates switch magnet 22 as often as key 19 is operated and released. In this manner the brushes associated with switch magnet 22 are rotated to any desired position. In a similar manner the operation and release of key 21 places ground through its front contacts through the winding of stepping magnet 23 to the battery, stepping the brushes associated with arcs 28, 29, 30 and 85 to any desired position.

Key 18 when operated opens the circuit for operating magnet 22 so that the brushes associated with banks 25, 26, 27, and 84 are not progressed to the next line up for test but remain on the one line as long as key 18 is operated.

In case it is desired to skip automatically any set of terminals of any of the switches which may or may not be connected to a telegraph line or switch, ground such as at 86 or 87 is connected to the contacts of arc 84 or 85 occupying the same relative position in these arcs as the contacts in arcs 25 to 30 which it is desired to skip. When the brushes of arcs 84 or 85 make contact with any contact connected to ground, a circuit from this ground through the brush and respective operating magnet contact and magnet 22 or 23 to battery is completed. This causes the stepping magnet to operate which in turn interrupts its operating circuit. The magnet then releases and advances the brushes to the next set of contacts.

What is claimed is:

1. A telegraph testing system comprising a receiving device, a second receiving device, automatic means for varying the operating limits of said second receiving device, circuit means for comparing the signals as received by said two receiving devices, and means jointly controlled by said circuit means and said automatic means for recording the operating limits for satisfactory operation of said second device.

2. A device for automatically determining and recording the operating limits of printing telegraph circuits which comprises two receiving distributors, means for connecting said distributors to a telegraph circuit to be tested, contacts controlled by each of said distributors, automatic means for varying the orientation of one of said distributors, circuit means connected to said contacts for comparing the signals as received by said distributors, and recording means controlled by said circuit means and said automatic means for recording the operating limits of said printing telegraph circuit under test.

3. A printing telegraph testing system comprising a receiving distributor, a set of permutation elements controlled thereby, contact means controlled by said permutation elements, a second receiving distributor, a second set of permutation elements controlled thereby, a second set of contacts controlled by said second set of permutation elements, circuit means connecting said contacts for comparing the setting of said permutation elements, means for automatically varying the orientation of said second distributor, means jointly controlled by said circuit means and said automatic means for recording the orientation of said second distributor for satisfactory operation thereof, and switching means for connecting said distributor to a telegraph circuit to be tested.

4. In a telegraph system, a routine testing device comprising a monitoring device, a second monitoring device, means for automatically adjusting the operating limits of said second monitoring device, means for comparing the signals received by said monitoring devices, and switching means for automatically connecting said monitoring devices in each of a plurality of telegraph circuits to be tested.

5. A printing telegraph testing device comprising two receiving distributors, contacts controlled by each of said distributors, automatic means for varying the orientation of one of said distributors, circuits connected to the contacts of said distributors for comparing the similarity or difference in position of the contacts controlled by each of said distributors, a plurality of switches for connecting said distributors to each of a group of telegraph circuits to be tested, means for automatically advancing said switches after each of said telegraph circuits has been tested, and instrumentalities for indicating circuits under test, additional means for connecting said distributors to any specified line of said group of lines, and means for disabling said automatic advancing means.

6. A telegraph circuit monitoring device comprising a receiving distributor, instrumentalities for varying the orientation of said receiving distributor, and means responsive to received signals for actuating said instrumentalities.

7. In a telegraph circuit, a testing device comprising a monitoring device, a second monitoring device, a circuit including both said monitoring devices, switch means for connecting said circuit to telegraph circuits to be tested, means for varying the operating limits of said devices, and means responsive to received signals for actuating said varying means of said second monitoring device.

SIDNEY H. GIFFIN.